(12) United States Patent
Monge et al.

(10) Patent No.: US 12,320,332 B2
(45) Date of Patent: Jun. 3, 2025

(54) VERTICAL AXIS WIND TURBINE WITH VARIABLE THICKNESS BLADE

(71) Applicant: Wind Harvest International Inc, Davis, CA (US)

(72) Inventors: Antonio Ojeda Monge, El Puerto de Santa Maria (ES); Alin Ionut Munteanu, Leuven (BE); David John Malcolm, Kirkland, WA (US); Jeffrey Willis, Omaha, NE (US); Olamide Ajala Inyang, San Leandro, CA (US)

(73) Assignee: Wind Harvest Intl, Davis, CA (US)

( * ) Notice: Subject to any disclaimer, the term of this patent is extended or adjusted under 35 U.S.C. 154(b) by 0 days.

(21) Appl. No.: 18/295,077

(22) Filed: Apr. 3, 2023

(65) Prior Publication Data
US 2024/0328385 A1    Oct. 3, 2024

(51) Int. Cl.
 *F03D 3/06* (2006.01)
 *F03D 3/00* (2006.01)

(52) U.S. Cl.
 CPC ............ *F03D 3/005* (2013.01); *F03D 3/062* (2013.01); *F05B 2240/31* (2013.01)

(58) Field of Classification Search
 CPC .... F03D 3/005; F03D 3/062; F05B 2240/212; F05B 2240/213; F05B 2240/214; F05B 2240/301; F05B 2240/31
 See application file for complete search history.

(56) References Cited

U.S. PATENT DOCUMENTS

| | | | |
|---|---|---|---|
| 6,364,609 B1 * | 4/2002 | Barnes | F03D 3/005 416/142 |
| 7,510,366 B2 * | 3/2009 | Okubo | F03D 3/064 415/4.4 |
| 8,043,067 B2 | 10/2011 | Kuroiwa et al. | |
| 10,408,060 B2 | 9/2019 | Godichon et al. | |
| 2005/0099013 A1 * | 5/2005 | Noguchi | F03D 3/005 290/55 |
| 2005/0212300 A1 * | 9/2005 | Kimura | F03D 80/70 290/55 |

(Continued)

FOREIGN PATENT DOCUMENTS

| EP | 0277607 A1 * | 8/1988 |
| ES | 2333499 B1 | 10/2010 |

(Continued)

*Primary Examiner* — David E Sosnowski
*Assistant Examiner* — Wayne A Lambert
(74) *Attorney, Agent, or Firm* — Jeremy A. Briggs

(57) ABSTRACT

A vertical axis wind turbine with variable thickness blade is disclosed. The wind turbine may include a blade including a skin having a first skin section and a second skin section. A first skin section thickness may be greater than a second skin section thickness. The blade may further include a bracketed structural member disposed on the first skin section. The bracketed structural member may include one or more L-shaped brackets. The wind turbine may further include a nut bar, which may be a flat nut bar. The bracketed structural member may be configured to hold the nut bar between the L-shaped brackets. The wind turbine may further include an arm connecting bracket that may be configured to attach the arm to the blade via the nut bar. The wind turbine may further include a transition fairing that may attach to the blade via the nut bar.

13 Claims, 10 Drawing Sheets

(56) References Cited

U.S. PATENT DOCUMENTS

| | | | |
|---|---|---|---|
| 2007/0177970 A1 | 8/2007 | Yokoi | |
| 2007/0231139 A1* | 10/2007 | Yokoi | F03D 3/005 416/119 |
| 2010/0133852 A1* | 6/2010 | Preus | F03D 7/041 290/55 |
| 2011/0171025 A1* | 7/2011 | Levine | F03D 3/061 416/223 R |
| 2018/0186103 A1 | 7/2018 | Hunter et al. | |

FOREIGN PATENT DOCUMENTS

| | | | | |
|---|---|---|---|---|
| FR | 2930601 A1 | | 10/2014 | |
| GB | 2484107 A | * | 4/2012 | ............ F03D 3/062 |
| KR | 101003176 B1 | * | 12/2010 | |
| KR | 101042906 B1 | * | 6/2011 | |
| WO | 2017141501 A1 | | 8/2017 | |

\* cited by examiner

VERTICAL AXIS WIND TURBINE WITH VARIABLE THICKNESS BLADE

TECHNICAL FIELD

The present disclosure relates to a wind turbine, and more specifically to a vertical axis wind turbine having variable thickness blades attached with turbine arms using L-shaped brackets and nut bars, and a polygonal turbine mast attached with a polygonal drive shaft top end.

BACKGROUND

Wind turbines use air flow or wind to generate energy. Wind drives rotation of turbine blades, and turbine generators convert blade kinetic energy into electric power. While wind is essential for wind turbine operation, turbulent winds may exert considerable stress on turbine structure and connections between different turbine components. For example, connections between turbine blades and arms may get damaged in turbulent weather or wind conditions.

Vertical axis wind turbines may experience more turbulence than horizontal axis wind turbines as vertical axis wind turbines are disposed in proximity to ground, and wind turbulence may be more pronounced closer to the ground. Therefore, blade-arm connection in a conventional vertical axis wind turbine may be more prone to failure or damage in turbulent wind conditions.

A conventional method to secure blade-arm attachment includes the use of reinforcements (e.g., ply or metal plates) that may be disposed between the blade and the arm at blade-arm connection point. The reinforcements are typically custom manufactured such that reinforcement shapes may be equivalent to curved shapes of the blades. Since the reinforcements may be required to be custom manufactured, use of reinforcements may be expensive for wind turbine operators/manufacturers.

The conventional blade-arm attachment method may additionally include the use of epoxy that may be applied between blade-reinforcement connections. Addition of epoxy may further increase cost of wind turbine assembly and installation. In addition, application of reinforcements and epoxy may be a complex process and may hence cause inconvenience to wind turbine operators/manufacturers.

Furthermore, a blade-arm connection using reinforcements and epoxy may develop fractures or bends when the blades rotate and exert centrifugal force on the connection. In addition, even when the blades are stationary and not rotating (e.g., when there may be no wind or low wind speed), gravitational force may pull vertically oriented blades "downwards," thus causing stress at the blade-arm connection. The (blade arm) connection may be damaged in time due to stresses caused by the several sources of loads (gravitational, aerodynamic, and rotating frame effects)

Apart from the blade-arm connection, connections between turbine mast and the arms may also be susceptible to damage due to wear and tear. For example, in a conventional vertical axis wind turbine, arms may be welded or bolted to the mast, which may make the mast-arm connection prone to fatigue and stresses, especially in turbulent wind conditions. Further, conventional turbine masts are typically cylindrical in shape, which may make it difficult and expensive to bolt or weld turbine components (e.g., arms, flanges, etc.) to mast surfaces.

To address some of the structural challenges experienced by the wind turbine, a conventional method includes increasing a number of arms attached between the blades and the turbine mast. While such structure may make the turbine sturdy, addition of arms may increase drag and may thus affect turbine performance and costs.

Thus, there is a need for a robust vertical axis wind turbine that overcomes the structural challenges associated with a conventional vertical axis wind turbine.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
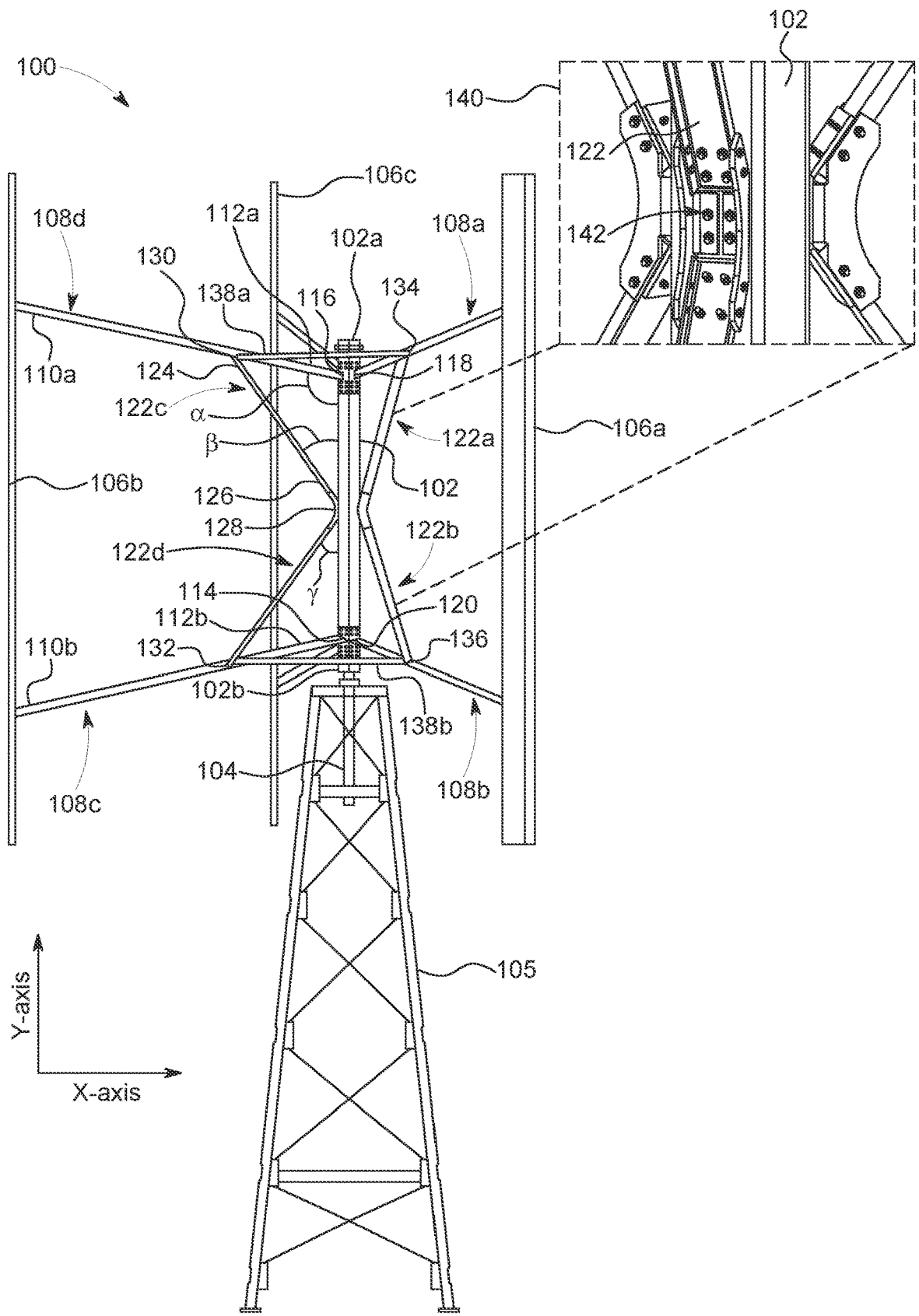
FIG. 1 depicts an example vertical axis wind turbine in accordance with the present disclosure.

The present disclosure is directed to a vertical axis wind turbine system. The wind turbine may include a mast, one or more blades, and one or more arms connecting the blades with the mast. The mast may be disposed perpendicular to ground and may be attached to the arms such that arm longitudinal axis may be disposed at a predefined angle relative to a mast longitudinal axis. In some aspects, the predefined angle may be 90 degrees such that the arms may be attached perpendicularly to the mast. In other aspects, the predefined angle may be in a range of 55 to 125 degrees. The mast may be attached to the arms via arm distal ends, and arm proximal ends may be attached to the blades. In some aspects, blade longitudinal axis may be parallel to the mast longitudinal axis. Stated another way, the blades too may be disposed perpendicular to the ground.

In some aspects, a blade may be defined as an object (e.g., a single structure or a single object) that may be attached to the mast via one or more arms. The blades may include an airfoil shape such that the blades may receive a lift force causing blade movement when wind exerts force on the blades. The blades may axially rotate relative to the mast longitudinal axis when the wind exerts the lift force on the blades, causing the arms to move. Arm movement may in turn cause axial mast rotation relative to the mast longitudinal axis. In this manner, wind may cause blade rotation, which may further cause mast rotation.

A mast bottom end may be attached to a drive shaft, which may be connected to a power generator directly or through a gearbox. The drive shaft may be a cylindrical rod that may rotate axially when the mast rotates. Drive shaft rotation may enable the power generator to generate electric power. In this manner, the wind turbine may convert wind energy into electric energy.

The wind turbine may further include one or more vertical and/or horizontal bracing members that may add structural integrity to the wind turbine. Specifically, one or more wind turbine connections (e.g., blade-arm connection, arm-mast connection, etc.) may experience a centrifugal and a Coriolis force and rotating frame effects when the blades rotate due to wind lift force. The connections may also experience gravitational force when the blades may be stationary (due to no or low wind speed). The vertical bracing members may connect one or more arm surfaces with one or more mast surfaces and may thus add "vertical" and "horizontal" structural integrity to the wind turbine. For example, a vertical bracing member may connect a mast middle portion along a mast length to an arm middle portion along an arm length (or a portion in proximity to an arm distal or proximal end). The vertical bracing members may enable the arms and the arm-mast connections to withstand "gravitational pull" that the arms/connections may experience when the blades may not be rotating. Each vertical bracing member may be disposed at predefined angle relative to the mast longitudinal axis, which may range from 20 to 45 degrees.

In some aspects, the wind turbine may include only the vertical bracing members (and no horizontal bracing member). In other aspects, the wind turbine may include one or more horizontal bracing members, in addition to the vertical bracing members. The horizontal bracing members may connect one or more adjacent arm surfaces. For example, a horizontal member may connect a middle portion of a first arm with a middle portion of a second arm that may be disposed adjacent to the first arm in the wind turbine. The horizontal bracing members may enable the arms and the arm-mast connections to withstand the centrifugal force (and the gravitation force) that the arms/connections may experience when the blades may be rotating.

In an exemplary aspect, the wind turbine may include three blades, and each blade may be connected to the mast via two arms. Stated another way, each blade may be attached to two arms, and thus the wind turbine with three blades may include six arms. Further, the wind turbine may include six vertical bracing members and six horizontal bracing members.

In some aspects, the mast may have polygonal cross-section having a predefined count of mast faceted sides. For example, the mast may have hexagonal cross-section. In this case, the wind turbine may further include a polygonal drive shaft top end. The polygonal drive shaft top end may have same count of faceted sides as the count of mast faceted sides. For example, the polygonal drive shaft top end too may have hexagonal cross-section. Dimensions and alignment of each mast faceted side and each drive shaft top end faceted side may be equivalent. The polygonal mast bottom end may attach to the polygonal drive shaft top end, thereby enabling connection between the mast and the drive shaft (that may be cylindrical).

In further aspects, each blade may have a set of elongated I-beam walls surrounded by a skin. The skin and the I-beam walls may have variable thicknesses. Each blade may have an extruded body having a skin exterior surface and a skin interior surface. The skin exterior surface may be exposed to ambient environment (e.g., wind). The skin may have a plurality of thick skin sections and a plurality of thin skin sections. A thick-skin section thickness may be greater than a thin-skin section thickness. In an exemplary aspect, the blade may include four thick skin sections. Further, the blade may include I-beam walls that may have variable thicknesses. In some aspects, each blade may include a balance of the area of thick and thin skin sections, and thick and thin I-beam walls, thereby ensuring that blade weight does not substantially increase.

Blade thick-skin sections may be used to attach the blade with an arm. For example, one or more thick-skin sections may include a bracketed structural member including two opposing L-shaped brackets. The L-shaped brackets may be configured to hold a nut bar between the brackets. The blade may be attached with the arm by using the nut bar held between the L-shaped brackets.

The wind turbine may additionally include a connection member that may enable secure attachment between the blade and arm by using the nut bar. The connection member may include a bracket, a yoke, and a pivotal pin. The bracket may include a bracket plate that may be attached to a blade inside portion skin via the nut bar and one or more first fasteners, which may be bolts or screws. Bracket plate profile (e.g., curvature) may be same as blade inside portion skin profile (e.g., curvature), thereby enabling direct attachment between the bracket plate and the blade inside portion. Stated another way, since the bracket plate profile may be equivalent to the blade inside portion skin profile, external reinforcements (e.g., ply or metal plates) and/or epoxy may not be required to secure the bracket plate with the blade inside portion skin.

The yoke may be attached to the arm via one or more second fasteners, which may also be bolts or screws. The pivotal pin may be configured to axially attach the bracket (which may be attached to the blade) and the yoke (which may be attached to the arm), thereby enabling blade-arm connection. The pivotal pin may ensure that the connection between the bracket and the yoke (and hence between the blade and the arm) may be "flexible", thus enabling the blade-arm connection to more effectively handle wind loading and turbulence.

In further aspects, the bracket may be configured to be covered with a transition fairing, which may enable the blade-arm connection to be aerodynamic. The transition fairing may be attached to the bracket plate via one or more third fasteners, which may be pins or screws. The transition fairing may be attached over the connection member, so that connection member structure may not cause drag when the wind exerts lift force on the blade.

The present disclosure discloses a robust vertical axis wind turbine that can withstand wind turbulence and prevent fractures at various turbine connections more efficiently than conventional vertical axis wind turbines. For example, presence of vertical and/or horizontal bracing members may prevent the mast-arm connections and the arms from developing faults or fractures caused by gravitational and/or centrifugal forces. The vertical and/or horizontal bracing members may also make the wind turbine structure sturdier, thereby enabling the wind turbine to withstand wind turbulence more effectively than conventional vertical axis wind turbines. Further, variable thickness blades may enable easier assembly and more secure connection between the blades and the arms without requiring external reinforcements and/or epoxy, thereby reducing manufacturing cost and easing wind turbine manufacturing/assembling process. Furthermore, blade-arm connection using a pivotal pin ensures that the connection is flexible and not rigid, thereby reducing the probability of fractures that may occur in the blade at the blade-arm connection. Furthermore, an arm-mast connect using a set of hinges ensures that the connection is flexible and not rigid, thereby reducing probability of fractures that may occur at the mast arm connection. In addition, polygonal-shaped mast may enable a wind turbine operator/manufacturer to conveniently attach various wind turbine components (e.g., arms, drive shaft top end, vertical and/or horizontal bracing members) to the mast, which may not be easily possible in a cylindrical mast of a conventional vertical axis wind turbine.

These and other advantages of the present disclosure are provided in detail herein.

ILLUSTRATIVE EMBODIMENTS

The disclosure will be described more fully hereinafter with reference to the accompanying drawings, in which example embodiments of the disclosure are shown, and not intended to be limiting.

FIG. 1 depicts an example vertical axis wind turbine 100 (wind turbine 100) in accordance with the present disclosure. The wind turbine 100 may include a vertical mast 102 (mast 102) that may have a mast top end 102a and a mast bottom end 102b. The mast 102 may be made of metal such as aluminum, iron, steel, lightweight alloy, composites and/or the like. In some aspects, the mast 102 may be made of steel. Further, in some aspects, exterior mast, braces, and blade arm surfaces may be coated with anti-rust and icing coatings, which may protect the mast 102 (and other wind turbine components) from rusting and icing events when the mast 102 (and other wind turbine components) may be exposed to water and icing conditions.

Figure 7:
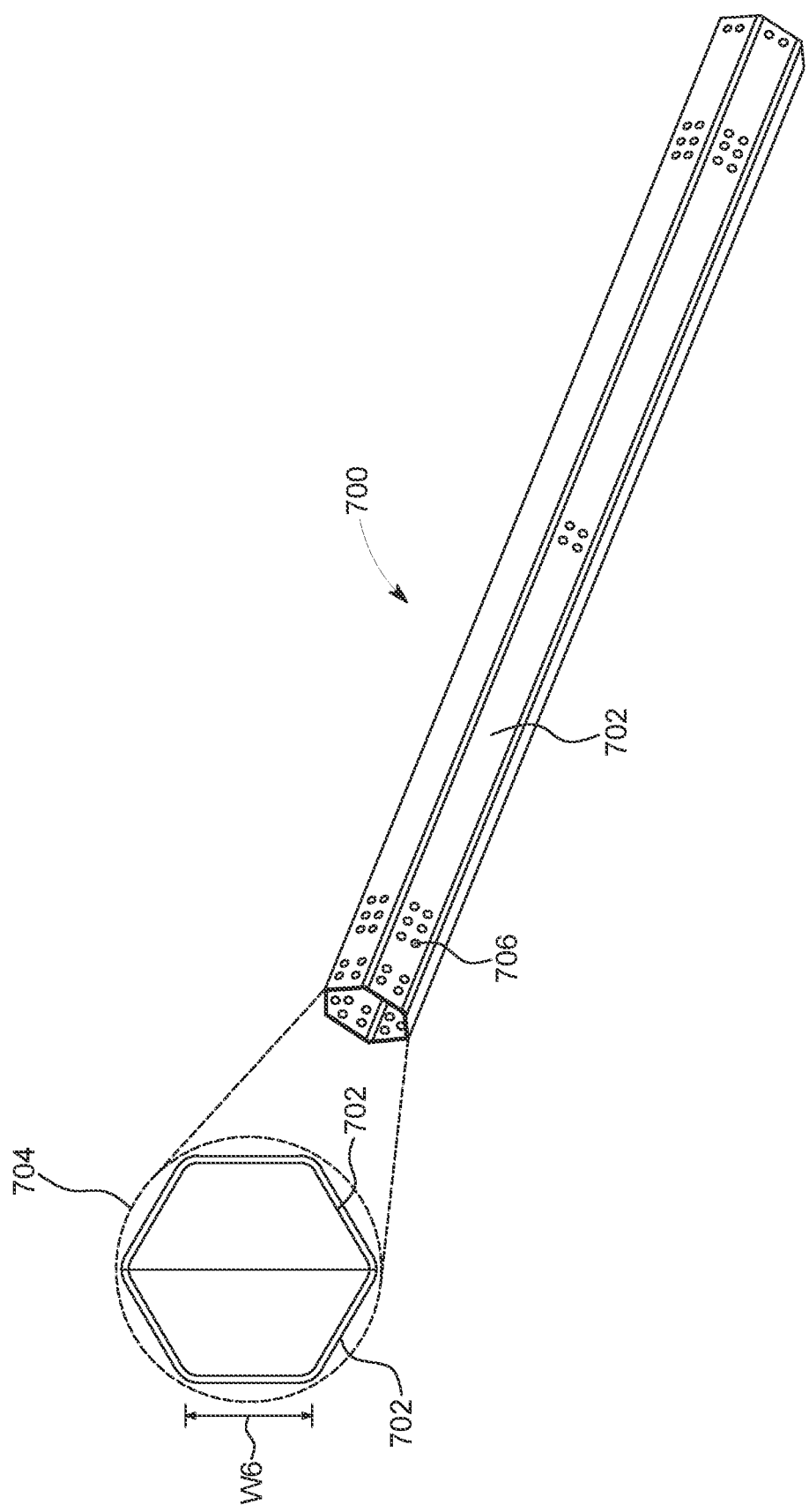
FIG. 7 depicts an example polygonal turbine mast in accordance with the present disclosure.

The mast 102 may be disposed or aligned perpendicular to ground and may be of any length depending on one or more parameters including wind turbine 100 dimensions, location of geographical area where the wind turbine 100 may be located, desired electric power output from the wind turbine 100, and/or the like. Further, the mast 102 may be polygonal in shape having a predefined count of faceted surfaces. For example, in a preferred aspect, the mast 102 may have hexagonal cross-section, as depicted in FIG. 7, and described in detail later in the description below. In other aspects, the mast 102 may have cuboidal, pentagonal, octagonal, etc., cross-sectional shape. Furthermore, in some aspects, the mast 102 may be hollow throughout a mast length. In other aspects, one or more mast interior portions may be hollow, and remaining mast interior portions may be solid.

The mast bottom end 102b may be attached to a drive shaft 104 via a drive shaft top end (shown as drive shaft top end 1000 in FIG. 10 and described in detail later in the description below). Specifically, the drive shaft 104 may include a drive shaft top end and a drive shaft bottom end (not shown). The drive shaft top end may be configured to connect the mast bottom end 102b with internal and/or external plates that are bolted together with fastening packs or "nut packs". Nut packs are contemplated in U.S. Pat. No. 8,713,896B2, which is incorporated herein by reference.

The drive shaft bottom end may be connected directly or through a gearbox to a power generator (not shown) that may be configured to generate electric power when the mast 102 rotates (thus rotating the drive shaft 104). Specifically, the power generator may convert mast kinetic energy into electric energy, thus generating electric power from the wind turbine 100.

In some aspects, the drive shaft 104 may be made of metal such as iron, steel, aluminum, a combination thereof, and/or the like. Further, the drive shaft 104 may be of any length depending on the wind turbine 100 dimensions and other factors, a distance between the drive shaft top end and the power generator, a distance between the mast bottom end 102b and the ground, etc. The drive shaft 104 may be a solid cylindrical drive shaft that may be configured to operate with a conventional power generator. Further, the drive shaft top end may be polygonal in shape to enable secure connection between the mast bottom end 102b and the drive shaft top end, as described below in conjunction with FIG. 10. Further, the drive shaft may connect to an extender that couples to the power generator and brake further below.

In some aspects, the wind turbine 100 may further include a tower 105 that attach to the drive shaft 104 and the power generator via attachment mechanisms (not shown). The tower 105 may be configured to increase wind turbine 100 height. In other aspects, the wind turbine 100 may be disposed on a short tower that accommodates the drive shaft 104 and brake with the power generator attached to the foundation at the base of the tower 105.

The wind turbine 100 may further include one or more blades 106a, 106b, 106c (collectively referred to as blades 106) that may be disposed parallel to a mast 102 longitudinal axis (shown as Y-axis in FIG. 1). In some aspects, a blade may be defined as an object (e.g., a single structure or a single object) that may be attached to the mast 102 via one or more arms. The blades 106 may be hollow elongated airfoil shaped blades, having lengths in a range of 5 meters or more depending on the wind turbine 100 dimensions. The blades 106 may be lightweight and made of metal such as aluminum. In other aspects, the blades 106 may be made of material other metal e.g., fiberglass, plastic, etc.

In some aspects, the wind turbine 100 may include two, three, four, five, or any other count of blades 106. In a preferred aspect, the wind turbine 100 may include three blades 106 that may be disposed at equal distance from each other. The wind turbine 100 may further include one or more arms 108 (shown as arms 108a, 108b, 108c, 108d) that may be configured to connect the mast 102 with respective blades 106. In a preferred aspect, the wind turbine 100 may include six arms, and each blade 106 may be connected with two arms 108. The arms 108 may be made of the same or similar material as the mast 102 and/or the blades 106 and may be cuboidal in shape. Specifically, the arms 108 may be hollow elongated cuboids having dimensions (e.g., length and width) that may vary based on the wind turbine 100 dimensions and may be covered by fairings that may be aerodynamically shaped. In other aspects, the arms 108 may be made of extruded or pultruded material and may be airfoil shaped, which may make the arms 108 aerodynamic. In yet another aspect, the arms 108 may be shaped as elongated rectangular plates.

Each arm 108 may include an arm proximal end and an arm distal end. For example, the arm 108d may include an arm proximal end 110a and an arm distal end 112a, and the arm 108c may include an arm proximal end 110b and an arm distal end 112b. Similarly, the arms 108a, 108b may have respective arm proximal ends and arm distal ends.

The arms 108 may be attached to the mast 102 via the arm distal ends at respective mast connection points. For example, the arm 108c may be attached to the mast 102 at a first mast connection point 114 via the arm distal end 112b. The first mast connection point 114 may be disposed in proximity to the mast bottom end 102b. In some aspects, the first mast connection point 114 may be disposed at a first predefined distance from the mast bottom end 102b. The first predefined distance may be based on the wind turbine 100 dimensions.

Similarly, the arm 108d may be attached to the mast 102 at a second mast connection point 116 via the arm distal end 112a. The second mast connection point 116 may be disposed in proximity to the mast top end 102a. In some aspects, the second mast connection point 116 may be disposed at a second predefined distance from the mast top end 102a. The second predefined distance may be based on the wind turbine 100 dimensions. In some aspects, the first predefined distance may be same as the second predefined distance. In other aspects, the first predefined distance may be different from the second predefined distance.

In a similar manner, the arms 108a and 108b may be attached to the mast 102 at mast connection points 118 and 120 via respective arm distal ends. The mast connection point 118 may be disposed at the second predefined distance from the mast top end 102a, and the mast connection point 120 may be disposed at the first predefined distance from the mast bottom end 102b.

In some aspects, the arm distal ends (e.g., 112a, 112b) may attach to the mast 102 via a fastening mechanism that may include, for example, a set of fastener packs or "nut packs" with interior plates and/or exterior plates. Nut packs are contemplated in U.S. Pat. No. 8,713,896B2, which is incorporated herein by reference. An example nut pack is depicted in FIG. described later in the description below.

In some aspects, the arms 108 may be attached to the mast 102 such that an arm 108 longitudinal axis may be perpendicular to the mast 102 longitudinal axis, as shown in FIG. 1. In other aspects, the arm 108 longitudinal axis may be disposed at a predefined angle "a" relative to the mast 102 longitudinal axis. The angle "a" may range from 55 to 125 degrees. Further, in some aspects, each arm 108 may be disposed at the same angle "a" relative to the mast 102 longitudinal axis. In other aspects, one or more arms may be disposed at different angles relative to the mast 102 longitudinal axis than remaining arms.

Figure 3:
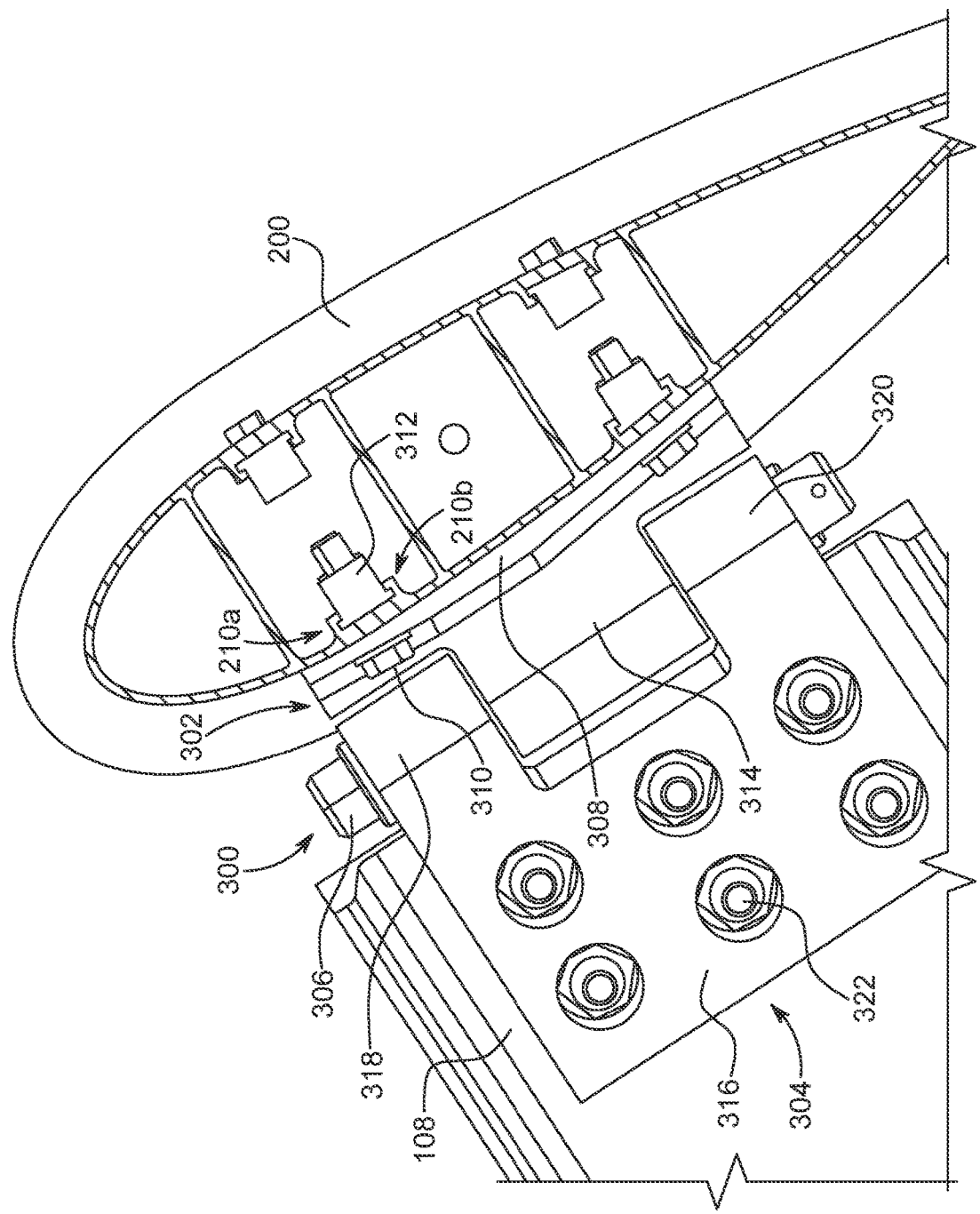
FIG. 3 depicts an example connection member connecting a turbine arm with the turbine blade of FIG. 2 in accordance with the present disclosure.
Figure 4:
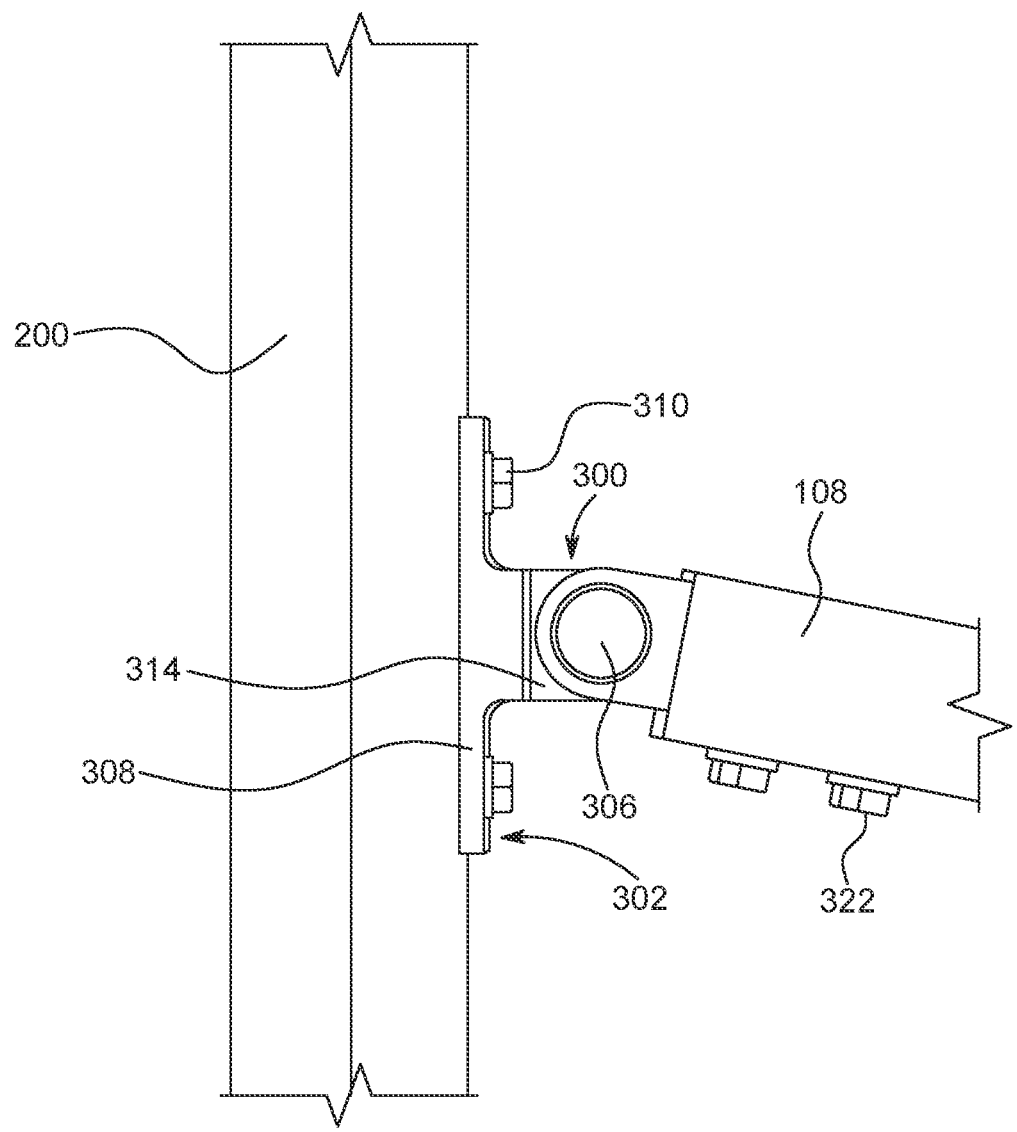
FIG. 4 depicts a side view of the connection member of FIG. 3 in accordance with the present disclosure.
Figure 5:
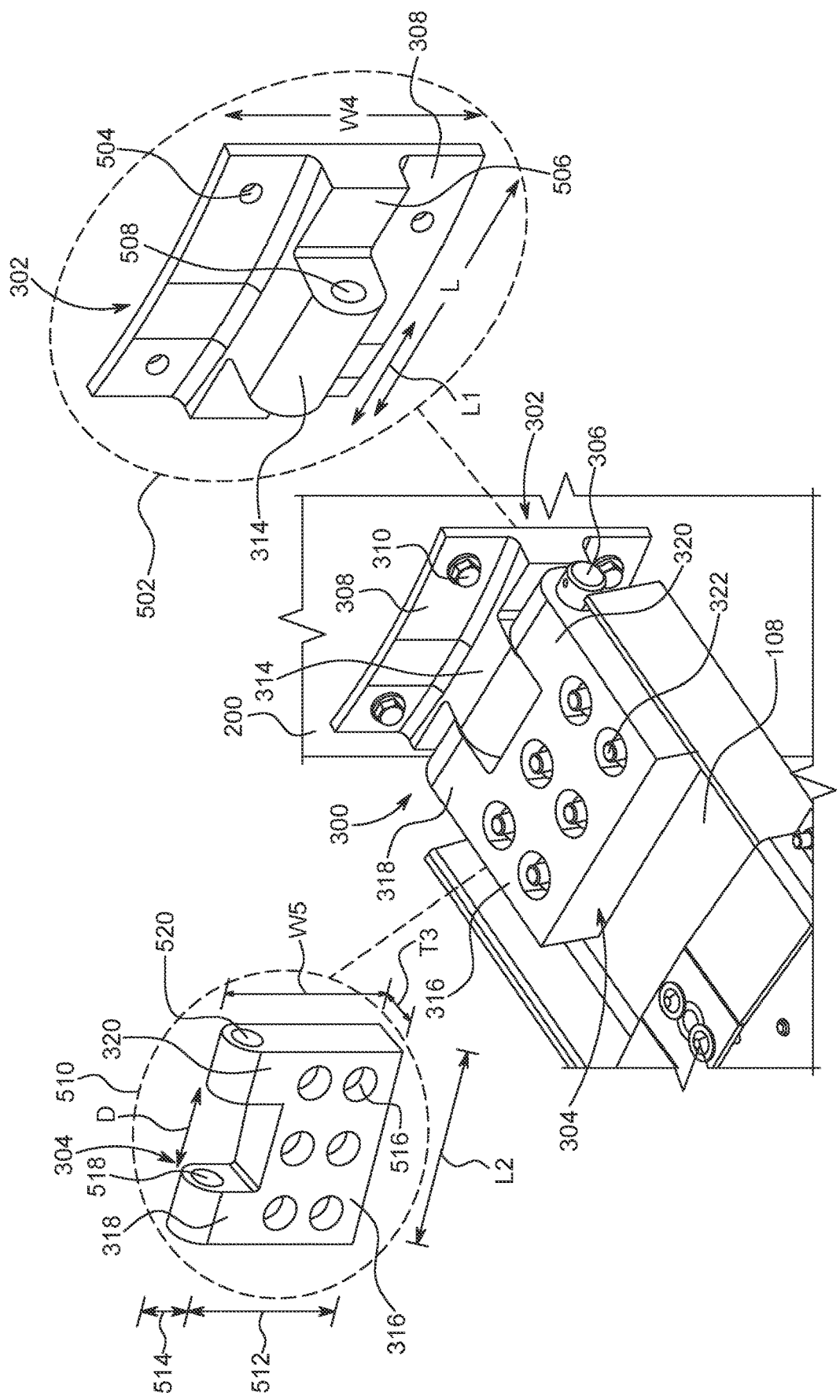
FIG. 5 depicts an isometric view of the connection member of FIG. 3 in accordance with the present disclosure.

Each arm 108 may be further attached to respective blade 106 via the arm proximal end. For example, the blade 106b may attach to the arm 108d via the arm proximal end 110a, and to the arm 108c via the arm proximal end 110b. Similarly, the blade 106a may attach to the arms 108a, 108b via respective arm proximal ends. The connection or attachment mechanism between the arms 108 and the blades 106 is depicted in FIGS. 3, 4 and 5, and described in detail later in the description below.

In some aspects, connection point between the arm proximal end 110a and the blade 106b may be disposed at a first blade predefined distance from a blade 106b top end. The first blade predefined distance may be based on the wind turbine 100 dimensions. In a similar manner, connection point between the arm proximal end 110b and the blade 106b may be disposed at a second blade predefined distance from a blade 106b bottom end. The second blade predefined distance too may be based on the wind turbine 100 dimensions. In some aspects, the first blade predefined distance may be same as or equivalent to the second blade predefined distance. In other aspects, the first blade predefined distance may be different from the second blade predefined distance. In an exemplary aspect, a ratio of the first blade predefined distance and a blade 106 length may be a first predefined constant, such that the first blade predefined distance may vary based on the blade 106 length (however, the ratio may remain constant). Similarly, a ratio of the second blade predefined distance and the blade 106 length may be a second predefined constant. The first and the second predefined constants may be same or different.

Further, in a preferred aspect, each blade 106 may be attached to two arms 108, as shown in FIG. 1. For example, the blade 106a may be attached to the arms 108a, 108b, and the blade 106b may be attached to the arms 108c, 108d.

In operation, wind may cause the blades 106 to rotate axially relative to the mast 102 longitudinal axis due to blade airfoil shape. Blade 106 rotation may cause arm 108 movement, and thus cause mast 102 rotation.

Since the blades 106 may be attached to just two arms 108 (and not more than two arms), drag due to the arm profile to the wind may be significantly reduced, resulting in more efficient wind turbine operation. Further, cost of assembling and manufacturing the wind turbine 100 may be reduced, as compared to conventional wind turbines that may include more than two arms for each blade.

To ensure that wind turbine 100 structure is robust and can withstand wind turbulence, the wind turbine 100 may include one or more vertical and/or horizontal bracing members. In some aspects, the wind turbine 100 may include only one or more vertical bracing members, and no horizontal bracing members. In other aspects, the wind turbine 100 may include one or more horizontal bracing members, in addition to the vertical bracing members. For example, as shown in FIG. 1, the wind turbine 100 may include one or more vertical bracing members 122a-d (collectively referred to as vertical bracing members 122) that may be attached between the mast 102 and the arms 108 via a fastening mechanism (e.g., via the set of fastener packs or the "nut packs" with plates, depicted in FIG. 9). In a preferred aspect, the wind turbine 100 may include six vertical bracing members 122 (one for each arm 108), and each vertical bracing member 122 may attach an arm 108 to the mast 102. The vertical bracing member 122 may be a hollow cuboid or a rectangular plate, and may have dimensions (e.g., length and width) that may be based on the wind turbine 100 dimensions. Further, the vertical bracing member 122 may be made of the same material as the mast 102, the arm 108, or the blade 106. For example, the vertical bracing member 122 may be made of steel plate.

Each vertical bracing member 122 may include a vertical bracing member proximal end and a vertical bracing member distal end. For example, the vertical bracing member 122c may include a vertical bracing member proximal end 124 and a vertical bracing member distal end 126. The vertical bracing member distal end 126 may be attached to the mast 102 at a mast connection point 128, and the vertical bracing member proximal end 124 may be attached to the arm 108d at a first arm connection point 130. Similarly, the vertical bracing member 122d may be attached to the mast 102 at the mast connection point 128 via vertical bracing member 122d distal end, and to the arm 108c at a second arm connection point 132 via vertical bracing member 122d proximal end. In a similar manner, the vertical bracing members 122a, 122b may be attached to the mast 102 at respective mast connection points via respective vertical bracing member distal ends, and to the arms 108 at respective arm connection points (e.g., depicted as a third arm connection point 134 and a fourth arm connection point 136) via respective vertical bracing member proximal ends. In some aspects (as shown in FIG. 1), mast connection points associated with the vertical bracing members 122c and 122a may be disposed at same or equivalent distances from the mast top end 102a (or the mast bottom end 102b). Similarly, mast connection points associated with the vertical bracing members 122d and 122b may be disposed at same or equivalent distances from the mast top end 102a (or the mast bottom end 102b). In other aspects (not shown), mast connection points associated with the vertical bracing members 122c and 122a may be disposed at different distances from the mast top end 102a (or the mast bottom end 102b). Similarly, mast connection points associated with the vertical bracing members 122d and 122b may also be disposed at different distances from the mast top end 102a (or the mast bottom end 102b).

As depicted in FIG. 1, the mast connection point 128 may be disposed between the first mast connection point 114 and the second mast connection point 116. In some aspects, a distance between the mast connection point 128 and the first mast connection point 114 may be the same as a distance between the mast connection point 128 and the second mast connection point 116. In this case, a vertical bracing member 122c length may be same as or equivalent to a vertical bracing member 122d length. In other aspects, the distance between the mast connection point 128 and the first mast connection point 114 may be different from the distance between the mast connection point 128 and the second mast connection point 116. In this case, the vertical bracing member 122c length may be different from the vertical bracing member 122d length.

Furthermore, in some aspects, a distance between the first arm connection point 130 and the arm distal end 112a may be same as or equivalent to a distance between the second arm connection point 132 and the arm distal end 112b. In this case, the vertical bracing member 122c length may be the same as the vertical bracing member 122d length. In other aspects, the distance between the first arm connection point 130 and the arm distal end 112a may be different from the distance between the second arm connection point 132 and the arm distal end 112b. In this case, the vertical bracing member 122c length may be different from the vertical bracing member 122d length.

In further aspects and as shown in FIG. 1, the distance between the first arm connection point 130 and the arm distal end 112a may be less than a distance between the first arm connection point 130 and the arm proximal end 110a. Stated another way, the first arm connection point 130 may be disposed closer to the arm distal end 112a than the arm proximal end 110a. In other aspects, the first arm connection point 130 may be equidistant from the arm distal end 112a and the arm proximal end 110a, or the first arm connection point 130 may be disposed closer to the arm proximal end 110a and the arm distal end 112a. The second arm connection point 132 may have similar arrangement relative to the arm distal end 112b and the arm proximal end 110b.

Furthermore, each vertical bracing member 122 may be disposed at a predefined angle relative to the mast 102 longitudinal axis. For example, the vertical bracing members 122c, 122a may be disposed at an angle "B" relative to the mast 102 longitudinal axis, and the vertical bracing members 122d, 122b may be disposed at an angle "y" relative to the mast 102 longitudinal axis. In some aspects, the angles "B" and "y" may be the same. In this case, the vertical bracing member 122c length may be the same as or equivalent to the vertical bracing member 122d length. In other aspects, the angles "B" and "y" may be different from each other. In this case, the vertical bracing member 122c length and thickness may be different from the vertical bracing member 122d length. The angles "B" and "y" may vary based on the wind turbine 100 dimensions. In an exemplary aspect, the angles "B" and "y" may be in a range of 30 to 45 degrees.

An exemplary connection arrangement between the mast 102 and the vertical bracing members 122 is shown as view 140 in FIG. 1. Each vertical bracing member 122 may be connected to the mast 102 via a set of nut packs with plates (shown in FIG. 9) and one or more fasteners 142 (e.g., studs). Nut packs (or fastening packs) are contemplated in U.S. Pat. No. 8,713,896B2, which is incorporated herein by reference.

Vertical bracing member 122 arrangement, as depicted in FIG. 1 and described above, may enhance wind turbine 100 structural integrity. Specifically, a person ordinarily skilled in the art may appreciate that the arms 108 may experience gravitational force, which may exert stresses on the connections between the arms 108 and the blades 106, and between the arms 108 and the mast 102. Attachment of the vertical bracing members 122, as depicted in FIG. 1, may provide vertical support to the arms 108 and may facilitate in reducing stresses at the connections described above due to gravitational force and allow for blade arms with smaller profiles to the wind and thus less drag.

The blades 106 and the arms 108 may further experience centrifugal force and rotating frame effects when the wind rotates the blades 106. Along with the gravitational force, the centrifugal and other forces may cause stresses at the connections described above. To further enhance the wind turbine 100 structural integrity and to provide support to the connections to withstand stresses caused due to the gravitational and centrifugal forces, the wind turbine 100 may include one or more horizontal bracing members 138a, 138b (collectively referred to as horizontal bracing members 138).

The horizontal bracing members 138 may be attached to arm connection points between adjacent arms 108. For example, one end of the horizontal bracing member 138a may be attached to the first arm connection point 130 (or to a connection point in proximity to the first arm connection point 130), and the other end of the horizontal bracing member 138a may be attached to the third arm connection point 134 (or to a connection point in proximity to the third arm connection point 134). Similarly, one end of the horizontal bracing member 138b may be attached to the second arm connection point 132 (or to a connection point in proximity to the second arm connection point 132), and the other end may be attached to the fourth arm connection point 136 (or to a connection point in proximity to the fourth arm connection point 136). In some aspects, the horizontal bracing members 138 may be attached to the arms 108 via the set of fastener packs/nut packs with plates described in conjunction with FIG. 9.

The horizontal bracing members 138 may augment structural stability and integrity provided by the vertical bracing members 122 to the wind turbine 100 and may thus increase the wind turbine's 100 capacity to withstand turbulent wind conditions. Further, presence of vertical and horizontal bracing members may enable the wind turbine operator/manufacturer to manufacture the wind turbine 100 with two arms with smaller profiles for each blade, without compromising on wind turbine structural strength. As described above, having two smaller arms for each blade may reduce drag experienced by the wind turbine 100, and may thus enhance wind turbine performance.

Figure 2:
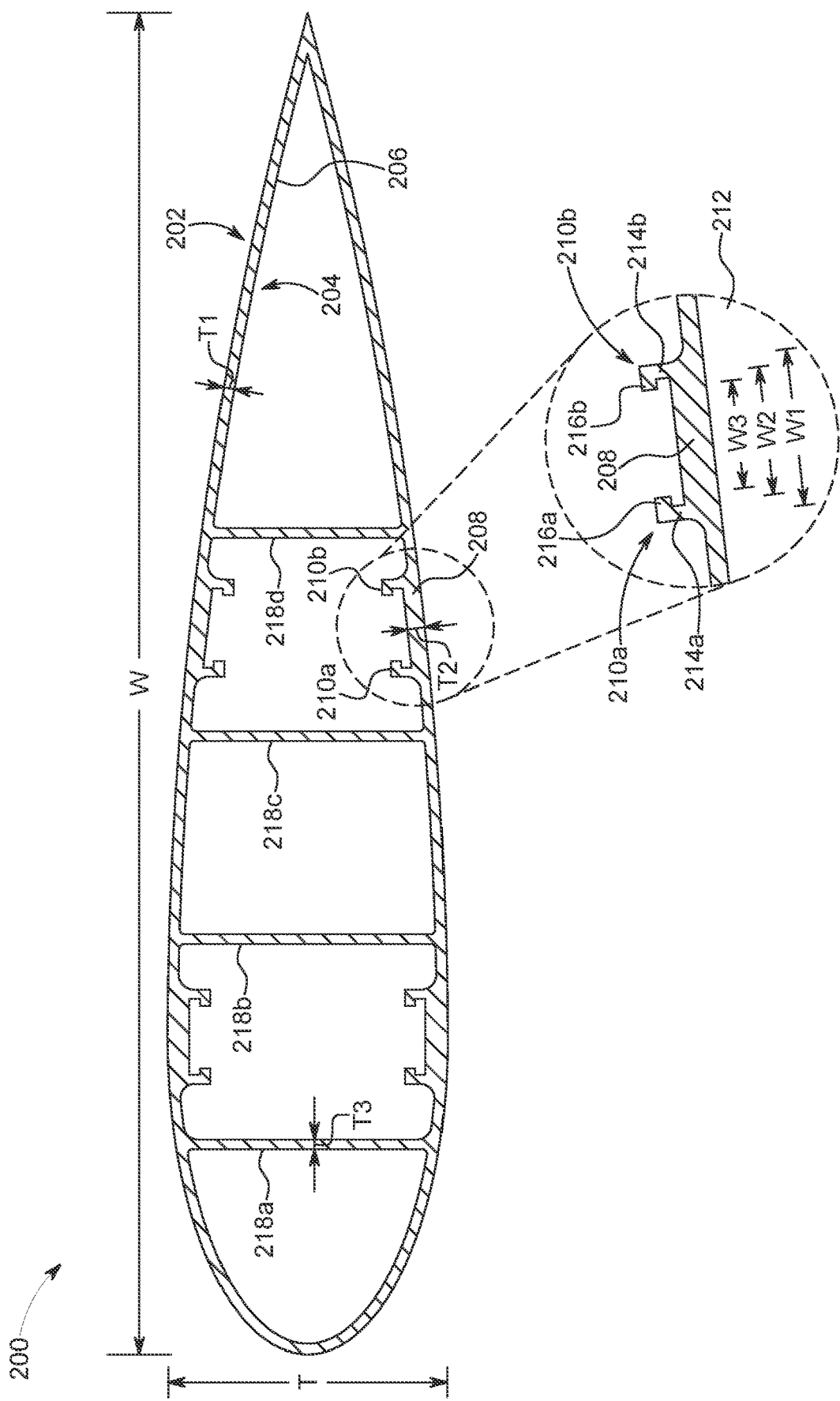
FIG. 2 depicts a cross-sectional view of an example turbine blade in accordance with the present disclosure.

FIG. 2 depicts a cross-sectional view (e.g., A-A section) of an example turbine blade 200 (blade 200) in accordance with the present disclosure. The blade 200 may be the same as the blade 106 described in conjunction with FIG. 1 and may be part of a vertical axis wind turbine (e.g., the wind turbine 100).

The blade 200 may have an extruded body and a hollow elongated airfoil shape, as shown in FIG. 2. The blade 200 may be made of metal such as aluminum, steel, iron, a combination thereof, or materials such as fiberglass, plastic, etc. In a preferred aspect, the blade 200 may be made of aluminum. Further, a blade 200 chord (width "W") may be in a range of 14 to 50 inches. In a preferred aspect, the blade 200 chord (width "W") may be in a range of 22 to 24 inches. A blade 200 thickness "T" may be in a range of 4 to 10 inches.

Further, the blade 200 may have a hollow interior body, and sections of the blade skin and walls (shown as I-beam walls 218a-d or in FIG. 2) may vary in thickness (with one or more walls thicker than other walls and sections of the skin thicker than other sections of the skin as described below) such that overall blade weight may be low. Specifically, the blade 200 weight may be lower than if the skin and walls were of uniform thickness.

The blade 200 may include a set of elongated I-beam walls 218a-d surrounded by a skin having a skin exterior surface 202 and a skin interior surface 204. The skin exterior surface 202 may be exposed to the ambient environment (e.g., wind) when the blade 200 may be attached to turbine arms (e.g., the arms 108) and operated in the wind turbine 100. The skin interior surface 204 may be inside the blade body and may attach to or be part of interior I-beam 218a-d walls that may vary in thickness. A second skin section 208 thickness "T2" may be greater than a first skin section 206 thickness "T1", as shown in FIG. 2. In some aspects, the thickness "T2" may be in a range of 6 to 16 millimeters. In a preferred aspect, the thickness "T2" may be 10 millimeters. The thickness "T1" may be in a range of 3 to 8 millimeters. In a preferred aspect, the thickness "T1" may be 4 millimeters.

In some aspects, the first skin section 206 and the second skin section 208 may form a unified skin of the blade 200. Further, the blade 200 may include more than one second skin sections 208 (i.e., "thick" interior skin sections). For example, as shown in FIG. 2, the blade 200 may include four "thick" interior skin sections. In this manner, the blade 200 may have variable thickness skin sections and walls. In some aspects, the four thick skin sections may be disposed at a predefined distance from adjacent thick skin sections. For example, two thick skin sections may be disposed in proximity to a blade 200 left edge, and remaining two thick skin sections may be disposed in proximity to a blade 200 right edge.

A person ordinarily skilled in the art may appreciate that since "thick" skin sections are disposed on an interior blade surface (as shown in FIG. 2) and not on an exterior blade surface, aerodynamic shape/structure of the blade 200 may not be affected by blade variable thickness skin sections. Stated another way, since the skin exterior surface 202 does not show variable thickness, blade 200 rotation (because of wind lift force) may not be affected. The "thick" skin sections may be used to attach the blade 200 with the arms 108, as described in detail later in the description below.

The second skin section 208 (i.e., the thick skin section) may include a bracketed structural member that may be configured to hold a nut bar (shown as nut bar 312 in FIG. 3) or connect a nut bar to the second skin section 208. The nut bar may enable the blade 200 to attach to the arms 108, as described later in conjunction with FIG. 3. In some aspects, the second skin section 208 may be "flat" such that a flat nut bar can be connected to the bracketed structural member (as opposed to a curved nut bar, which may be expensive). The bracketed structural member may include a first L-shaped bracket 210a and a second L-shaped bracket 210b. A zoomed view of the first L-shaped bracket 210a and the second L-shaped bracket 210b is shown as view 212 in FIG. 2.

The bracketed structural member may be configured to slide, position, and hold the nut bar between the first L-shaped bracket 210a and the second L-shaped bracket 210b, as shown in FIG. 3. In some aspects, the first L-shaped bracket 210a and the second L-shaped bracket 210b may be disposed on the "thick" skin section (as shown in FIG. 2) or walls 218a-d. Further, the first L-shaped bracket 210a, the second L-shaped bracket 210b and the "thick" skin section may form a unified integrated second skin section 208. The first L-shaped bracket 210a and the second L-shaped bracket 210b may be disposed along an entire blade length (not shown in FIG. 2) such that the bracketed structural member may form a "nut bar rail". Since the L-shaped brackets 210a, 210b extend along the blade length, the bracketed structural member may enable a wind turbine 100 operator/manufacturer to slide, position and hold nut bars between the L-shaped brackets 210a, 210b at any location along the blade length. Bracketed structural members may be symmetrically installed on both interior blade skins to benefit the extrusion or pultrusion process and to provide a way to attach blade end caps or blade tip fairings to the blade 200.

As shown in the view 212, the first L-shaped bracket 210a and the second L-shaped bracket 210b may be disposed at opposing bracketed structural member edges (or "thick" skin section edges). For example, the first L-shaped bracket 210a may be disposed at a bracketed structural member left edge, and the second L-shaped bracket 210b may be disposed at a bracketed structural member right edge. A distance between the bracketed structural member left edge and the bracketed structural member right edge (i.e., a second skin section 208 width "W1") may depend on nut bar dimensions. In some aspects, the width "W1" may be in a range of 30 to 80 millimeters.

Each L-shaped bracket 210a, 210b may include a first part 214a, 214b and a second part 216a, 216b. The first part 214a and the second part 216a may be disposed perpendicular to each other, as shown in the view 212. Similarly, the first part 214b may be disposed perpendicular to the second part 216b. In some aspects, a distance "W2" between the first part 214a and the first part 214b may be in a range of 30 to 70 millimeters. In a preferred aspect, the distance "W2" may be 36 millimeters. Further, a distance "W3" between the second part 216a and the second part 216b may be in a range of 25 to 60 millimeters. In a preferred aspect, the distance "W3" may be 30 millimeters.

In some aspects, the blade 200 may have a symmetrical shape, such that an outside portion of the blade 200 may be similar to an inside portion of the blade 200. Blade outside portion may be the portion of the blade 200 that faces away from the mast 102 (when the blade 200 is connected to the mast 102), and the blade inside portion may be the portion of the blade 200 that faces towards the mast 102. Blade outside portion and blade inside portion may form an integrated structure of the blade 200. In some aspects, the blade outside portion may "mirror" the blade inside portion. Stated another way, blade outside portion structure and dimensions, and components included in the blade outside portion may be the same as blade inside portion structure and dimensions, and components included in the blade inside portion. For example, the blade outside portion may include two bracketed structural members, and the blade inside portion too may include two bracketed structural members that may be aligned opposite to the bracketed structural members disposed on the blade outside portion. In other aspects, the blade outside portion may have different structure and dimensions from the structure and dimensions of the blade inside portion.

A person ordinarily skilled in the art may appreciate that "mirrored" blade portions may enable the wind turbine 100 operator/manufacturer to attach the blade 200 to the arm 108 via either the blade outside portion or the blade inside portion. Stated another way, the blade 200 may be flipped around and may be configured to rotate in the opposite direction. Blade-arm attachment is described in detail in conjunction with FIGS. 3, 4 and 5.

In some aspects, one or more I-beam walls 218a-d (or webs 218a-d) may connect the blade outside portion and the blade inside portion. The beam walls 218a-d may be made of same material as the blade skin. For example, the beam walls 218a-d may be made of aluminum. Further, each beam wall 218a-d may have the same uniform or different thickness "T3". For example, the thickness "T3" may be in a range of 3 to 6 millimeters. In a preferred aspect, the thickness "T3" may be 4 millimeters.

In some aspects, the blade 200 may include four I beam walls, as shown in FIG. 2. In other aspects, the blade 200 may include more or less than four I-beam walls.

The beam walls 218a-d may provide structural stability to the blade 200. Specifically, the beam walls 218 may ensure that the blade outside portion and the blade inside portion do not "collapse" when the blade 200 experiences centrifugal force.

Although FIG. 2 depicts that the L-shaped brackets 210a, 210b are disposed at a certain distance from the beam walls 218a-d, in some aspects (not shown), the L-shaped brackets 210a, 210b may be disposed on the beam walls 218a-d. Specifically, the L-shaped brackets 210a, 210b may be part of adjacent beam walls, and may "protrude" perpendicularly from the beam wall longitudinal axis. In this case, the "thick" skin sections may extend between adjacent beam walls. Further, in this case, a count of beam walls in the blade 200 may depend on a count of L-shaped brackets that may be required in the blade 200, which in turn may depend on wind turbine 100 structure.

The blade 200 may attach with the arms 108 by using a connection member (for example, a connection member 300 shown in FIG. 3) disposed at the arm's distal end via L-shaped brackets 210a, 210b and the nut bar, as described above. Details of attachment mechanism between the blade 200 and the arms 108 are described in detail below, in conjunction with FIGS. 3, 4 and 5.

FIG. 3 depicts an example connection member 300 connecting the arm 108 with the blade 200 in accordance with the present disclosure. While describing FIG. 3, references may be made to FIGS. 4 and 5 that depict connection member side and isometric views, respectively.

The connection member 300 may include a bracket 302, a yoke 304, and a pivotal pin 306. The bracket 302, the yoke 304, and the pivotal pin 306 may be made of the same material or may be made of different materials. In some aspects, one or more of the bracket 302, the yoke 304 and the pivotal pin 306 may be made of metal such as steel, iron, aluminum, a combination thereof, and/or the like. In a preferred aspect, the bracket 302, the yoke 304, and the pivotal pin 306 may be made of aluminum. The bracket may have a material between disparate metals to reduce corrosion.

The bracket 302 may include a bracket plate 308 that may have a shape equivalent or similar to a blade inside portion skin shape. Specifically, the bracket plate 308 may be arc-shaped, and a bracket plate 308 curvature may be equivalent or similar to a blade inside portion skin curvature on which the bracket plate 308 may be attached. The bracket plate 308 may be lightweight and may be thin (e.g., having a thickness in a range of 5 to 15 millimeters), and may thus not significantly affect blade 200 aerodynamic structure/capability when the bracket plate 308 may be attached to the blade inside portion skin, as shown in FIG. 5. Further, bracket plate 308 dimensions (e.g., length and width) may be substantially smaller than blade 200 dimensions so that the bracket plate 308 may not affect blade 200 aerodynamic structure. For example, the bracket plate 308 may have a length "L" in a range of 4 to 20 inches, and a width "W4" in a range of 3 to 10 inches, as shown in view 502 of FIG. 5.

The bracket plate 308 may include one or more first connection inserts 504 (or holes 504), as shown in the view 502. In some aspects, the bracket plate 308 may include four connection inserts 504 that may be disposed in proximity to a bracket plate top left corner, top right corner, bottom left corner, and bottom right corner. In other aspects (not shown), the bracket plate 308 may include more or less than four connection inserts 504.

The bracket plate 308 may be configured to attach with the blade inside portion skin via one or more first fasteners 310 and one or more nut bars 312. The first fasteners 310 may be, for example, bolts or screws, and may be configured to insert into the first connection inserts 504. Further, the blade inside portion skin may also include blade connection inserts or blade holes (not shown), through which the first fasteners 310 may penetrate. Furthermore, the first and second L-shaped brackets 210a, 210b may be configured to hold the nut bars 312, as shown in FIG. 3 and described above in conjunction with FIG. 2.

The first fasteners 310 may penetrate through the first connection inserts 504, the blade connection inserts/holes, and the nut bars 312, and may thus enable fastening or attachment of the blade 200 with the bracket plate 308. Since the nut bars 312 are held between the first and second L-shaped brackets 210a, 210b and on the "thick" skin section of the blade 200 (e.g., the second skin section 208), the connection/attachment between the blade 200 and the bracket plate 308 may be rigid and structurally strong. In an exemplary aspect, by thickening portions/sections of the blade 200 skin and attaching the bracket plate 308 to the "thick" skin section via the nut bars 312, attachment rigidity or stiffness may increase in a range of 10 to 100%. Increased stiffness of blade 200 and bracket plate 308 attachment may enable the attachment to withstand turbulent wind conditions effectively. In some aspects, the bracket plate 308 may be attached to the blade 200 via two second skin sections 208 (or thick skin sections), as shown in FIG. 3.

Furthermore, as shown in FIGS. 3, 4 and 5, due to the "thick" blade skin section, the bracket plate 308 may be directly attached to the blade inside portion skin, without any intervening layer of reinforcements (e.g., ply and/or metal plates) or epoxy. In this manner, the attachment described above may enhance ease of wind turbine manufacturing and may enable cost saving (since reinforcement plates and/or epoxy may not be required).

The bracket plate 308 may be attached to the blade 200 at different locations on the blade inside portion skin. For example, the bracket plate 308 may be attached to the blade 200 in proximity to blade 200 top end (or blade 106 top end), and/or blade 200 bottom end (or blade 106 bottom end). In some aspects, the bracket plate 308 may be attached at a blade 200 middle portion, which may be equidistant from the blade 200 top end and the blade 200 bottom end. In other aspects, the bracket plate 308 may be attached to the blade 200 at a predefined distance from the blade 200 top end (or the blade 200 bottom end). The predefined distance may be based on the wind turbine 100 dimensions.

Furthermore, as shown in FIG. 3 (and as described above in conjunction with FIG. 2), the "thick" skin sections of the blade 200 and the nut bars 312 may be disposed on opposing blade portions. This "mirror" arrangement of thick skin sections and the nut bars 312 may enable the wind turbine 100 operator/manufacturer to attach the bracket plate 308 to the blade 200 at either portion (inside and outside) of the blade 200. As an example, if one blade portion gets damaged, the wind turbine 100 operator/manufacturer may attach the bracket plate 308 to the other portion and thus may not be required to replace the damaged blade with a new blade. As another example, the wind turbine 100 operator/manufacturer may choose a blade portion to attach the bracket plate 308 based on turbine rotational direction. In this manner, the same blade 200 may be used when the turbine may, for example, rotate clockwise, and may also be used when the turbine rotates counterclockwise.

The bracket 302 may further include an elongated structural member 314 that may be disposed on the bracket plate 308 such that an elongated structural member longitudinal axis may be parallel to a bracket plate length "L" (or a bracket plate longitudinal axis), as shown in the view 502. The elongated structural member 314 may be solid and may be shaped as a cuboid, a cylinder, or an inverted-U structure (as shown in the view 502). In an exemplary aspect, an elongated structural member "L1" may be less than the bracket plate length "L". "L1" may be, for example, in a range of 40-60% of "L".

The elongated structural member 314 may be attached to or be part of the bracket plate 308 directly, or the bracket plate 308 may include an elongated protrusion 506 on which the elongated structural member 314 may be attached, as shown in the view 502. The elongated structural member 314 and the bracket plate 308 (along with the elongated protrusion 506) may form a unitary integrated bracket 302 structure.

Furthermore, the elongated structural member 314 may include a first elongated cavity 508 that may be disposed along the length "L1". In some aspects, the first elongated cavity 508 may be disposed at an elongated structural member 314 center portion. The first elongated cavity 508 may have a diameter in a range of 1 to 5 cm. Further, the first elongated cavity 508 may be configured to receive the pivotal pin 306 and enable connection between the bracket 302 and the yoke 304, as described below.

The yoke 304 may be shaped as a rectangular solid, having a length "L2", a width "W5" and a thickness "T3", as shown in view 510. In an exemplary aspect, the length "L2" and the width "W5" may be the same as or equivalent to the length "L" and width "W4" of the bracket plate 308. Further, the thickness "T3" may depend on the wind turbine 100 dimension. and may be in a range of 4 to 14 centimeters.

The yoke 304 may include a first part 512 and a second part 514 disposed along the yoke 304 width "W5". The first part 512 may include a first portion 316 having a first portion length same as the yoke length "L2" and a first portion width less than the yoke width "W5". In some aspects, the first portion width may be in a range of 40% to 90% of the yoke width "W5".

The first portion 316 may include one or more second connection inserts 516 that may be holes (e.g., through-holes) that may extend through the yoke thickness "T3", as shown in the view 510. In some aspects, the first portion 316 may include six second connection inserts 516. In other aspects, the first portion 316 may include more or less than six second connection inserts 516.

The second connection inserts 516 may be configured to receive one or more second fasteners 322 and enable attachment between the yoke 304 (specifically the first portion 316) and the arm 108. The second fasteners 322 may be similar to the first fasteners 310, and may be, for example, bolts or screws. In this case, the arm 108 too may include arm connection inserts or arm holes (not shown), through which the second fasteners 322 may penetrate. The second fasteners 322 may penetrate through the second connection inserts 516 and the arm connection inserts to enable yoke-arm connection/attachment.

The second part 514 may include a second portion 318 and a third portion 320. The second portion 318 and the third portion 320 may be disposed at opposing yoke ends along the yoke length "L2". For example, the second portion 318 may be disposed at a yoke left end and the third portion 320 may be disposed at a yoke right end, as shown in the view 510.

The second and the third portions 318, 320 may be shaped as solid cylinders, cuboids, or may have an inverted U-shaped solid structure as shown in the view 510. First and second portion widths may be equal to a difference between the first portion width and the yoke width "W5". First and second portion thicknesses may be the same as the yoke thickness "T3". Further, first and second portion lengths may be less than the yoke length "L2". In some aspects, a first portion length and a second portion length may be the same. In other aspects, the first portion length and the second portion length may be different. In an exemplary aspect, the first portion length and/or the second portion length may be 20% to 80% of the yoke length "L2".

As shown in the view 510, the second portion 318 and the third portion 320 may be disposed at a predefined distance "D" from each other along the yoke length. The distance "D" between the second portion 318 and the third portion 320 may form a "gap" into which the elongated structural member 314 may be inserted to attach the bracket 302 with the yoke 304.

Furthermore, the second portion 318 may include a second elongated cavity 518 that may be disposed along the second portion 318 length, A second elongated cavity 518 center may coincide with a second portion 318 center. Stated another way, the second elongated cavity 518 may be disposed at a second portion 318 center portion. Similarly, the third portion 320 may include a third elongated cavity 520 that may be disposed along the third portion 320 length. A third elongated cavity 520 center may coincide with a third portion 320 center. First and second elongated cavity diameters may be same and may be equivalent to first elongated cavity 508 diameter.

In operation, the elongated structural member 314 may be inserted into the "gap" between the second portion 318 and the third portion 320, and the pivotal pin 306 may be inserted into the first elongated cavity 508, the second elongated cavity 518 and the third elongated cavity 520 to axially attach the yoke 304 with the bracket 302. The pivotal pin 306 may be a solid cylinder, and a pivotal pin 306 length may be equivalent to or greater than the length "L2" (or the length "L"). Further, a pivotal pin 306 diameter may be equivalent to diameters of the first, second and third elongated cavities (508, 518 and 520). Such pivotal pin 306 dimensions may ensure secure and stable yoke-bracket attachment.

A person ordinarily skilled in the art may appreciate that since the yoke 304 is attached with the arm 108, and the bracket 302 is attached with the blade 200, the attachment between the yoke 304, the bracket 302 and the pivotal pin 306 (as described above) may enable attachment between the arm 108 and the blade 200.

The connection member 300 including the yoke 304, the bracket 302 and the pivotal pin 306 may provide various advantages over conventional blade-arm attachment means. For example, the pivotal pin 306 may ensure that the connection between the yoke 304 and the bracket 302 may not be rigid and may enable the yoke 304 and the bracket 302 to axially move relative to each other. Such axial movement may ensure that the blade 200 and the arm 108 may also move relative to each other when the blade 200 may experience normal or turbulent wind conditions. In this manner, the connection member 300 may provide "flexible" attachment between the blade 200 and the arm 108, which may ensure that the connection member 300 may withstand wind loading more efficiently and durably than conventional blade-arm attachment means. A person ordinarily skilled in the art may appreciate that the "flexible" connection member 300 described above may ensure that stresses experienced by the connection member 300 are low and may hence enable secure blade-arm attachment that may experience substantially less damage with wear and tear and a longer fatigue life.

Further, since the connection member 300 allows flexibility (due to pivotal pin presence), the stresses experienced by the connection member 300 due to gravitational forces and/or centrifugal forces and/or other forces may also considerably reduce. Furthermore, the pivotal pin 306 may enable the wind turbine 100 operator/manufacturer to conveniently replace a blade when the blade gets damaged. For example, the wind turbine 100 operator/manufacturer may remove the pivotal pin 306 from the connection member 300 and disassemble the damaged blade. The wind turbine 100 operator/manufacturer may then attach a new blade to the connection member 300 and insert the pivotal pin 306 into the elongated cavities (508, 518 and 520) to secure new blade-arm attachment, as described above.

Although the description above describes an aspect where the bracket 302 may attach with the yoke 304, in other aspects, the bracket 302 may include means to attach with additional components, e.g., transition fairings, as described below in conjunction with FIG. 6.

Figure 6:
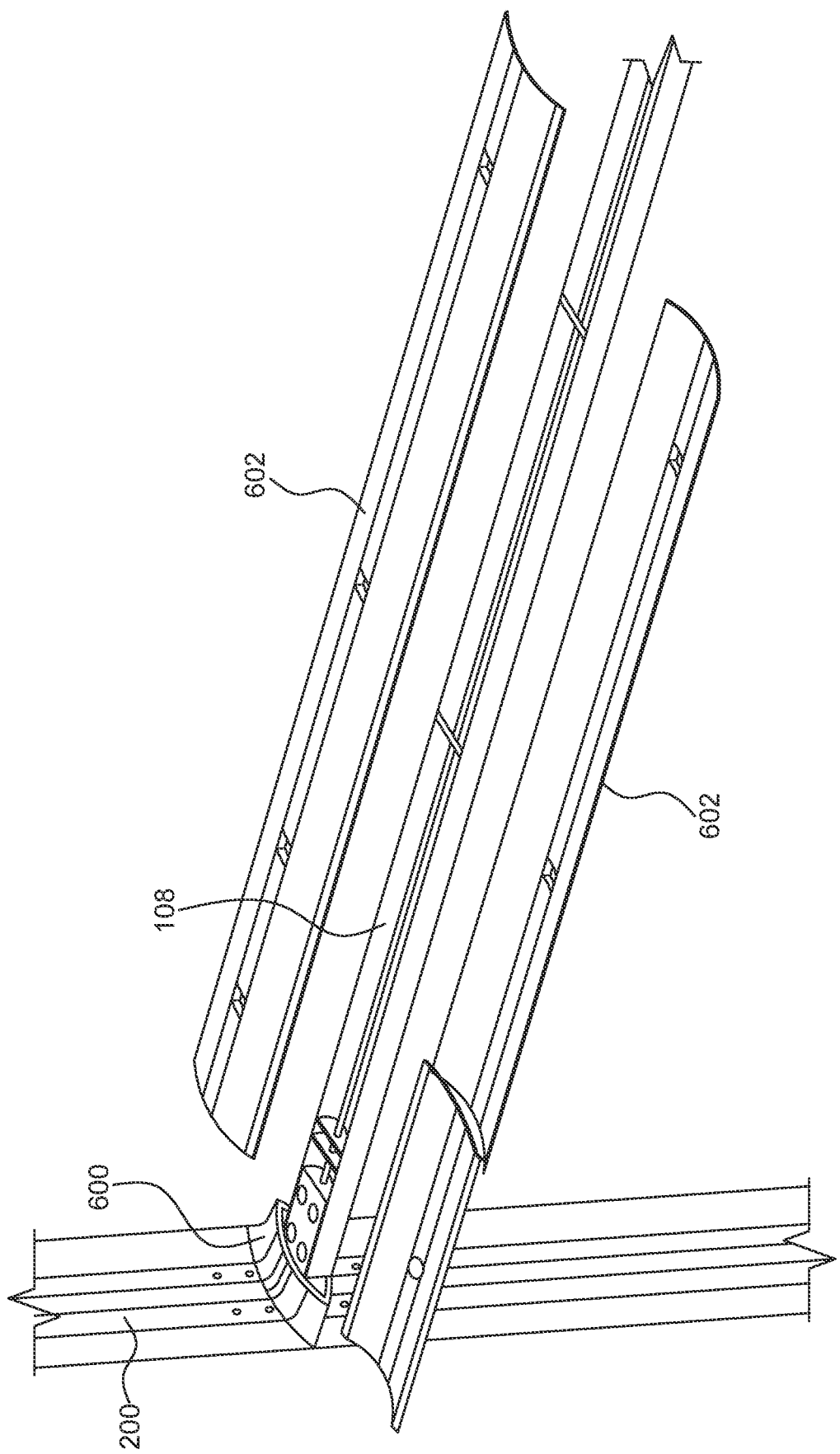
FIG. 6 depicts an example transition fairing attached at a blade-arm connection point in accordance with the present disclosure.

FIG. 6 depicts an example transition fairing 600 attached at (or covering) a blade-arm connection point in accordance with the present disclosure. The transition fairing 600 may be attached to the bracket 302 (not shown in FIG. 6), when (or after) the blade 200 and the arm 108 may be attached via the connection member 300. In this case, the bracket plate 308 may include one or more additional connection inserts (in addition to the first connection inserts 504) using which the transition fairing 600 may be attached to the blade-arm connection point. In this case, the transition fairing 600 may be attached to the bracket plate 308 via one or more third fasteners (not shown) that may insert into the additional connection inserts and attach the transition fairing 600 to the bracket plate 308. In some aspects, the third fasteners may be similar to the first fasteners 310 and the second fasteners 322. In other aspects, the third fasteners may be different from the first fasteners 310 and the second fasteners 322. For example, the third fasteners may be pins or screws. Further, the third fasteners may be configured to attach an interior surface (not shown) of the transition fairing 600 with the bracket plate 308, such that a transition fairing 600 exterior surface may form a flush finish/surface. Furthermore, the transition fairing 600 may fully enclose or partially enclose the connection member 300. For example, in some aspects, the transition fairing 600 may enclose the bracket 302, the yoke 304 and the pivotal pin 306. In other aspects, the transition fairing 600 may enclose the pivotal pin 306, the yoke 304 (as shown in FIG. 6) and the bracket 302 but not all of the bracket plate 308.

A person ordinarily skilled in the art may appreciate that a transition fairing (e.g., the transition fairing 600) may be attached over the connection member 300 to ensure that the connection member 300 may not affect blade 200 and/or arm 108 aerodynamic structure/properties. The wind turbine 100 may further include arm cover fairings 602 that may be disposed over an arm 108 top surface and an arm 108 bottom surface (as shown in FIG. 6) to enhance arm aerodynamic properties. The cover fairings 602 may have airfoil shape that may ensure that the cover fairings 602 do not experience higher levels of drag when wind blows through the arm 108 top and bottom surfaces. The transition fairing 600 may be attached to ends of the cover fairings 602 such that transition fairing-cover fairing connection may form a flush finish.

FIG. 7 depicts an example polygonal turbine mast 700 (mast 700) in accordance with the present disclosure. The mast 700 may be the same as the mast 102 and may be part of a wind turbine. For example, the mast 700 may be part of a vertical axis wind turbine (e.g., the wind turbine 100). The mast 700 may include a plurality of mast faceted sides 702. In an exemplary aspect depicted in FIG. 7, the mast 700 may have six mast faceted sides 702. In this case, the mast 700 may have a hexagonal cross-sectional shape, as shown in view 704. In other aspects, the mast 700 may have three, four, five, six, eight, nine, ten or twelve mast faceted sides 702.

Each mast faceted side 702 may have a width "W6" that may be in a range of 45 to 450 millimeters. Further, a mast 700 length may depend on the wind turbine 100 dimensions, location of area where the wind turbine 100 may be located, desired electric power output from the wind turbine 100, and/or the like.

One or more mast faceted sides 702 may include a plurality of through-holes 706, using which the mast 700 may be attached with various turbine components (e.g., the arms 108 via the arm 108 distal ends, the vertical bracing members 122, the horizontal bracing members 138, nutbars/nut packs, etc.). In some aspects, each through-hole 706 may be circular, and may have a diameter in a range of 8 to 50 mm. The wind turbine 100 operator/manufacturer may attach a set of fastener packs or "nut packs" with interior plates and/or exterior plates to mast 700 interior surface on the through-holes 706. The mast 700 may attach with the various turbine components via the fastener packs, as described below in conjunction with FIG. 9. For example, the arm 108 distal ends may be attached to mast 700 exterior surface via the set of fastener packs (with interior plates) disposed interior to the mast 700.

A person ordinarily skilled in the art may appreciate that since the mast 700 is polygonal shaped (e.g., the mast 700 has hexagonal cross-section) and hence includes a plurality of "flat" surfaces, attachment of various turbine components to the mast 700 surfaces may be easier than attachment of turbine components to a conventional turbine mast that may be cylindrical. Specifically, the wind turbine 100 operator/manufacturer may conveniently attach the turbine components to the "flat" mast 700 surfaces (e.g., by using the fastener packs), as compared to welding or bolting the turbine components to "rounded" mast surface or rings/flanges between sections of a conventional cylindrical turbine mast.

Figure 8:
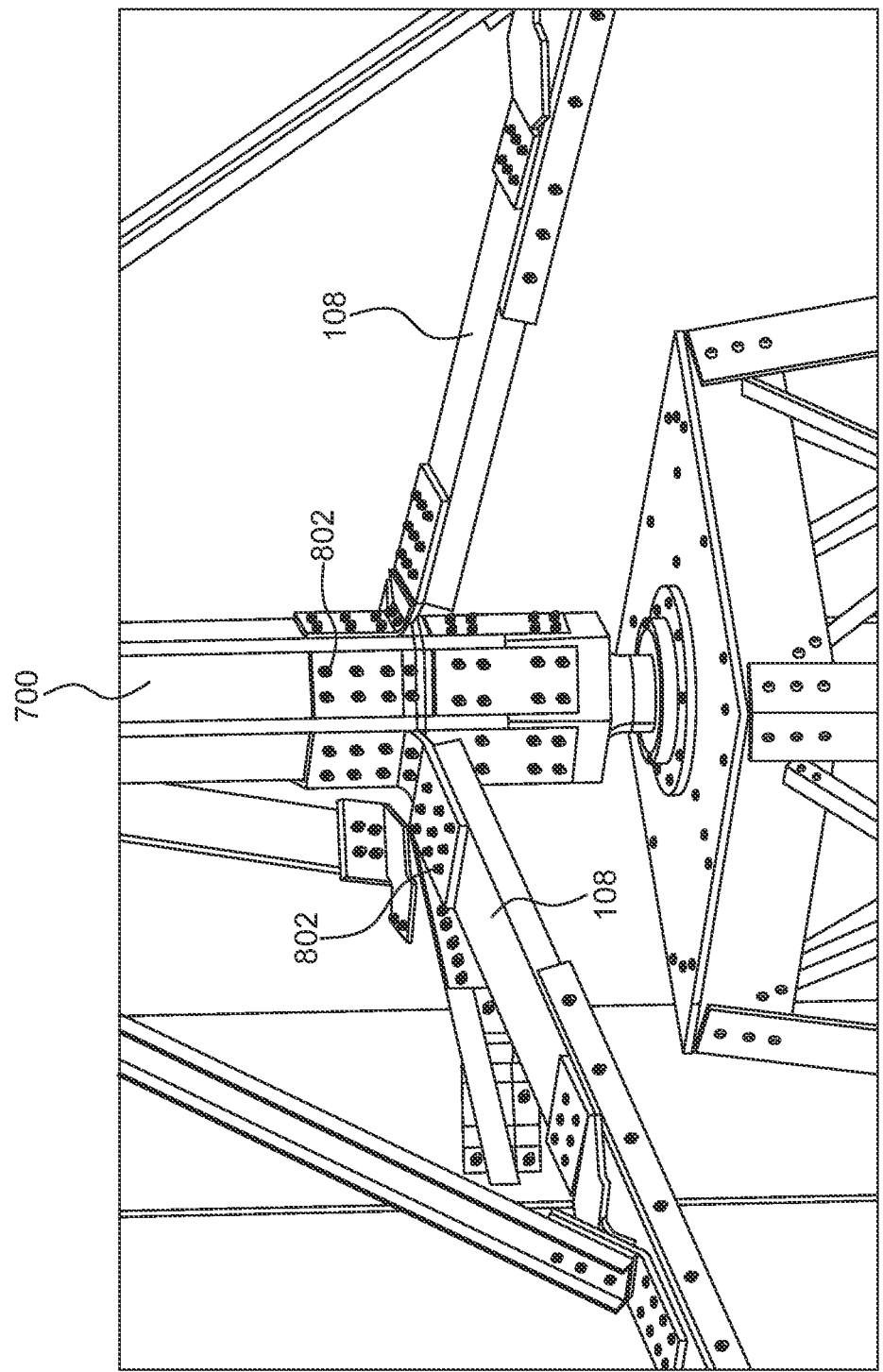
FIG. 8 depicts a connection between a turbine arm and the polygonal turbine mast of FIG. 7 in accordance with the present disclosure.

FIG. 8 depicts a connection between the arm 108 and the mast 700 in accordance with the present disclosure. The connection may be secured by using fastener members (shown as fastening member 902 in FIG. 9), which may be a set of fastener packs or "nut packs" with interior plates and/or exterior plates described above in conjunction with FIGS. 1 and 7. The fastening member may be disposed on the mast 700 interior surface (shown in FIG. 9). Similarly, the fastening member may be disposed on an arm 108 surface (for example, an arm 108 distal end surface). One or more threaded fasteners 802 (e.g., bolts, studs, etc.) may penetrate through the fastening member and the through-holes 706 to enable attachment between the mast 700 exterior surface and the arm 108 distal end attachment components/plates.

Figure 9:
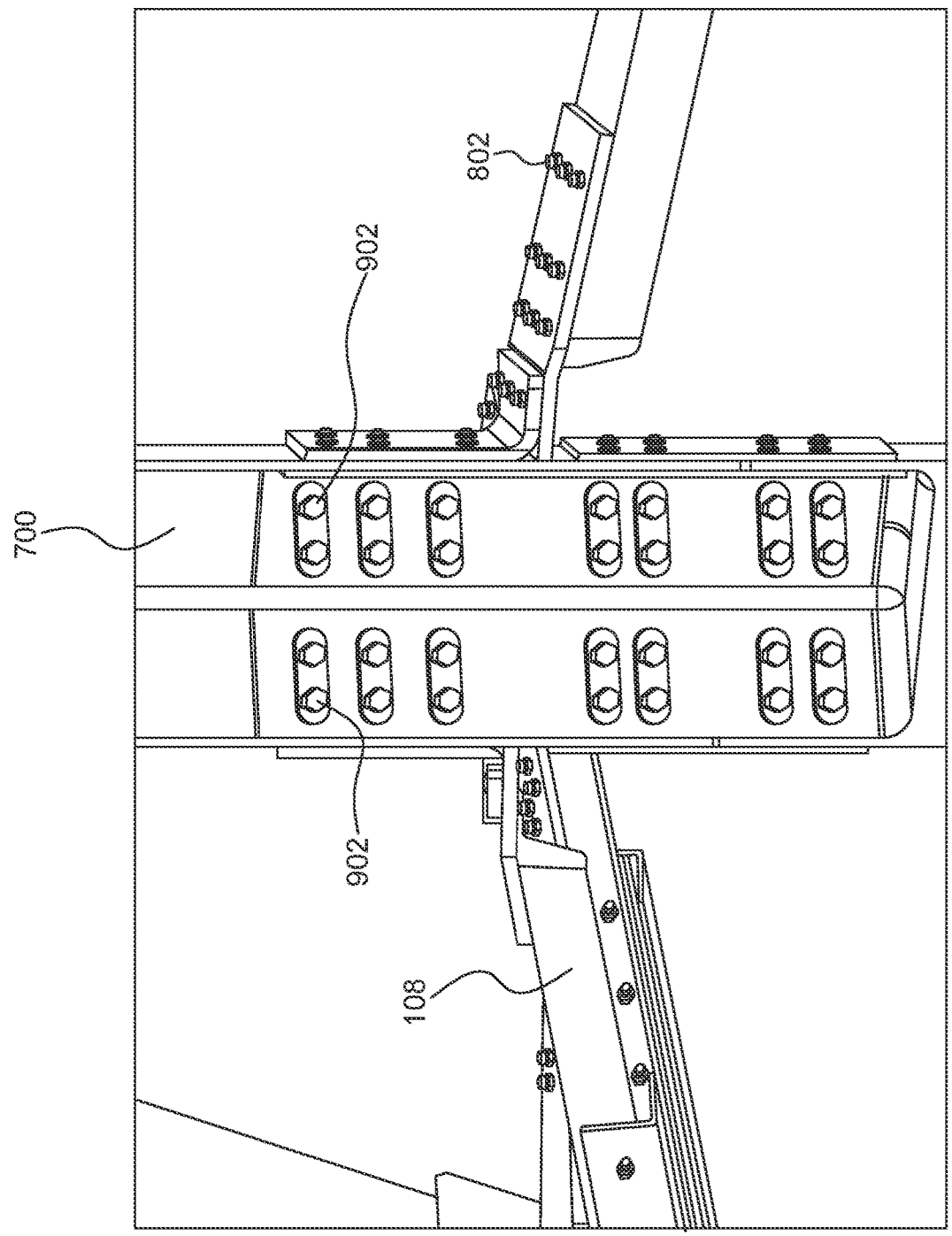
FIG. 9 depicts a view of a mast interior surface including the fastening member of FIG. 8 in accordance with the present disclosure.

The fastening member may be used for connecting flat surfaces disposed horizontally or vertically. Further, the fastening member may be used to attach various components on interior or exterior mast 700 surfaces. The fastening member, as described here, is shown in FIG. 9 and is contemplated in U.S. Pat. No. 8,713,896 B2, which is incorporated herein by reference (hereafter "'896 patent").

FIG. 9 depicts a view of a mast 700 interior surface including a fastening member 902 in accordance with the present disclosure. The fastening member 902 may be same as the fastening member described above in conjunction with FIGS. 1, 7 and 8. As described above, the fastening member 902 may be a set of nut packs with interior plates (and/or exterior plates) and may be disposed on mast 700 interior surface, and may enable turbine components (e.g., the arm 108) to attach to the mast 700 via the fasteners 802 (e.g., studs).

A person ordinarily skilled in the art may appreciate that attaching various turbine components to the mast 700 surfaces deep inside the mast using conventional attachment means may be challenging for the wind turbine 100 manufacturer and installer. The fastening member 902 may be installed at the mast 700 interior surface at the factory/shop while the mast 700 may be assembled or manufactured and may thus enable convenient attachment of turbine components to the mast 700 surfaces in the field. Fastening member 902 usage and advantages are described in detail in the above-referenced U.S. Pat. No. 8,713,896B2 patent.

Figure 10:
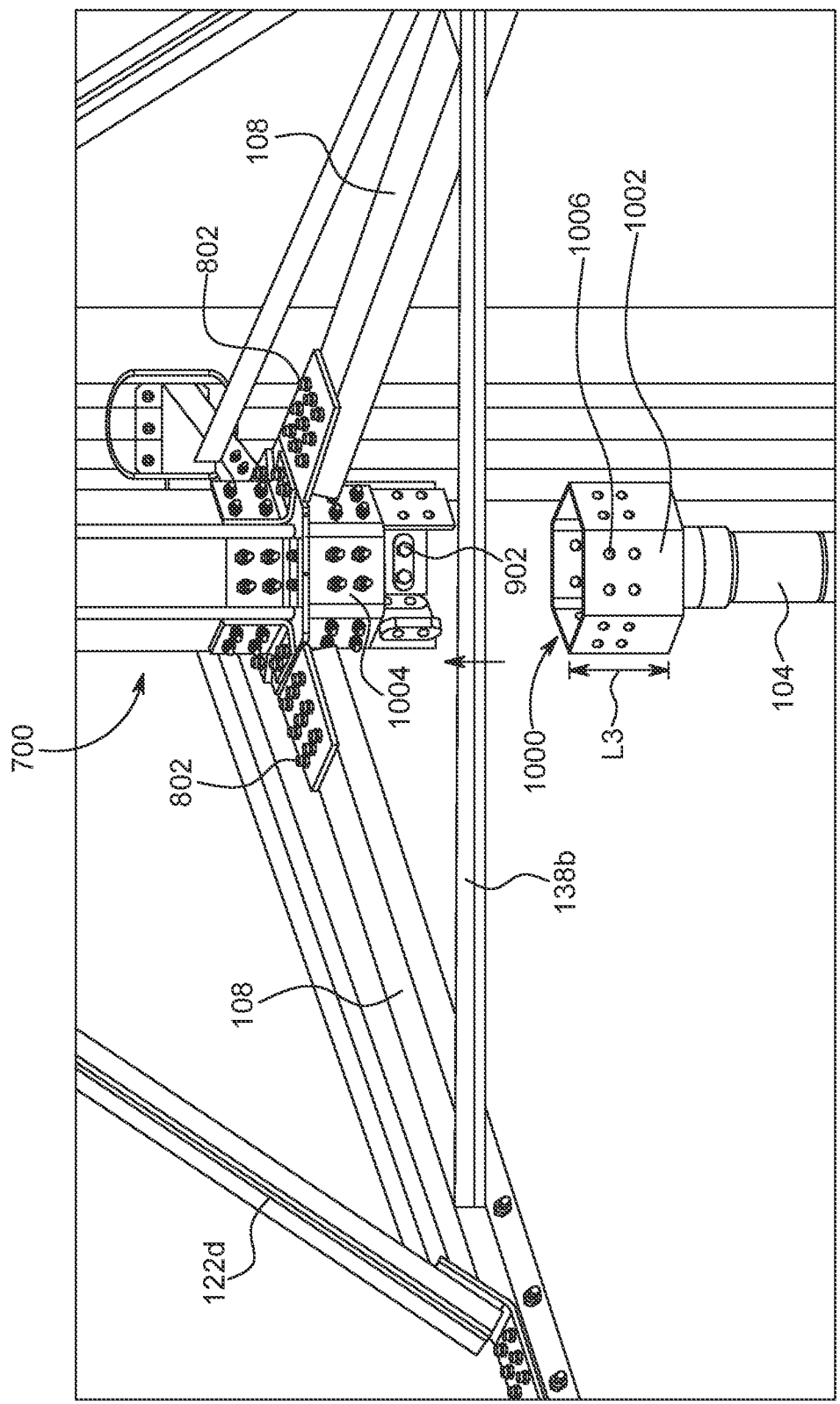
FIG. 10 depicts an example polygonal drive shaft top end in accordance with the present disclosure.

FIG. 10 depicts an example polygonal drive shaft top end 1000 in accordance with the present disclosure. As described in conjunction with FIG. 1, the drive shaft 104 may include the drive shaft top end 1000 and a drive shaft bottom end (not shown). The drive shaft bottom end may be connected to a power generator that may be configured to generate electric power when the mast 700 rotates, as described above. In some aspects, the drive shaft 104 may include a brake disk (not shown). In some aspects, the mast 700 may be attached to the drive shaft top end 1000 via the fastening members 902 (e.g., a set of nut packs with interior plates and/or exterior plates).

The drive shaft top end 1000 may have polygonal shape and may include a plurality of shaft top end faceted sides 1002. In some aspects, count, dimensions, and alignment of shaft top end faceted sides 1002 may be the same as count, dimensions, and alignment of mast faceted sides 702. Stated another way, drive shaft top end 1000 profile may be same as mast 700 cross-sectional profile and wall thickness. In an exemplary aspect, the mast 700 may have hexagonal cross section, and the drive shaft top end 1000 too may have hexagonal cross section. Further, a drive shaft top end 1000 length "L3" may depend on mast 700 length. For example, for a longer mast 700, the length "L3" may be larger, and for a relatively shorter mast 700, the length "L3" may be shorter. In an exemplary aspect, the length "L" may be in a range of 5 to 15 inches.

As described above, dimensions and alignment of shaft top end faceted sides 1002 may be same as dimensions and alignment of mast faceted sides 702. For example, a shaft top end faceted side width may be the same as the width "W6" that may be in a range of 4 to 20 inches.

As described above in conjunction with FIG. 1, the mast 700 may include a mast bottom end 1004 and a mast top end (not shown in FIG. 10). The drive shaft top end 1000 may be configured to connect the mast bottom end 1004 with the drive shaft 104. Specifically, the drive shaft top end 1000 may include a plurality of through-holes 1006 that may be similar to the plurality of through-holes 706 disposed on the mast 700 surfaces. The wind turbine 100 operator/manufacturer may attach fastening member plates to the shaft top end faceted sides 1002 via the through-holes 1006 that may enable the mast bottom end 1004 to be attached to the drive shaft top end 1000 (and thus to the drive shaft 104) via the fastening member 902.

A person ordinarily skilled in the art may appreciate that the same cross-sectional profiles of the mast 700 and the drive shaft top end 1000 may enable the wind turbine 100 operator/manufacturer to conveniently attach the mast 700 with the drive shaft 104 (which may include the drive shaft top end 1000). In this case, the drive shaft 104 may be a cylindrical drive shaft that may operate with a conventional power generator. Therefore, by using the drive shaft top end 1000 as described in the present disclosure, the wind turbine 100 operator/manufacturer may not be required to change drive shaft 104 design to attach to the polygonal mast 700. Instead, by using the polygonal drive shaft top end 1000, the wind turbine 100 operator/manufacturer may attach the polygonal mast 700 to a "conventional" cylindrical drive shaft 104.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc., should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A blade comprising:
a skin having a first skin section and a second skin section, wherein a first skin section thickness is greater than a second skin section thickness, and wherein the first skin section and the second skin section form a unified skin of the blade; and
a bracketed structural member disposed on the first skin section, wherein the bracketed structural member is configured to connect a nut bar to the first skin section, wherein the bracketed structural member comprises a first L-shaped bracket disposed at a bracketed structural member first edge and a second L-shaped bracket disposed at a bracketed structural member second edge, and wherein the bracketed structural member is configured to slide, position, and hold the nut bar between the first L-shaped bracket and the second L-shaped bracket.

2. The blade of claim 1, wherein the blade is part of a vertical axis wind turbine.

3. The blade of claim 1 further comprising a blade outside portion and a blade inside portion having same or different structure and dimensions.

4. The blade of claim 3 further comprising beam walls connected between the blade outside portion and the blade inside portion.

5. The blade of claim 3, wherein the blade outside portion and the blade inside portion form an integrated structure of the blade.

6. The blade of claim 1, wherein the blade is configured to be attached to a bracket of a connection member via the nut bar.

7. The blade of claim 1, wherein the blade is configured to be attached to a transition fairing or a bracket plate via the nut bar.

8. A vertical axis wind turbine comprising:
a blade comprising:
a skin having a first skin section and a second skin section, wherein a first skin section thickness is greater than a second skin section thickness, and wherein the first skin section and the second skin section form a unified skin of the blade; and
a bracketed structural member disposed on the first skin section;
a nut bar configured to be held by the bracketed structural member; and
an arm configured to be attached to the blade via the nut bar,
wherein the bracketed structural member comprises a first L-shaped bracket disposed at a bracketed structural member first edge and a second L-shaped bracket disposed at a bracketed structural member second edge, and wherein the bracketed structural member is configured to slide, position, and hold the nut bar between the first L-shaped bracket and the second L-shaped bracket.

9. The vertical axis wind turbine of claim 8, wherein the blade further comprises a blade outside portion and a blade inside portion having same or different structure and dimensions.

10. The vertical axis wind turbine of claim 9 further comprising beam walls connected between the blade outside portion and the blade inside portion.

11. A blade comprising:
a skin having a first skin section and a second skin section, wherein a first skin section thickness is greater than a second skin section thickness, and wherein the first skin section and the second skin section form a unified skin of the blade; and
a bracketed structural member disposed on the first skin section, wherein:
the bracketed structural member comprises a first L-shaped bracket disposed at a bracketed structural member first edge and a second L-shaped bracket disposed at a bracketed structural member second edge,
the bracketed structural member is configured to hold a flat nut bar, and
the bracketed structural member is configured to slide, position, and hold the flat nut bar between the first L-shaped bracket and the second L-shaped bracket, and
wherein the blade is part of a vertical axis wind turbine.

12. The blade of claim 11 further comprising a blade outside portion and a blade inside portion having same or different structure and dimensions.

13. The blade of claim 12 further comprising beam walls connected between the blade outside portion and the blade inside portion.

* * * * *